US008997839B2

United States Patent
Yang et al.

(10) Patent No.: US 8,997,839 B2
(45) Date of Patent: Apr. 7, 2015

(54) THIN HEAT PIPE STRUCTURE AND METHOD OF MANUFACTURING SAME

(75) Inventors: Hsiu-Wei Yang, New Taipei (TW); Ming-Tai Weng, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 780 days.

(21) Appl. No.: 13/043,484

(22) Filed: Mar. 9, 2011

(65) Prior Publication Data

US 2012/0180995 A1 Jul. 19, 2012

(30) Foreign Application Priority Data

Jan. 18, 2011 (TW) .................................. 100101753

(51) Int. Cl.
*F28D 15/00* (2006.01)
*B23P 15/26* (2006.01)
*F28D 15/04* (2006.01)

(52) U.S. Cl.
CPC ............. *B23P 15/26* (2013.01); *B23P 2700/09* (2013.01); *F28D 15/046* (2013.01)

(58) Field of Classification Search
USPC .............. 165/104.26, 104.19, 104.21, 104.22
See application file for complete search history.

(56) References Cited

U.S. PATENT DOCUMENTS

| 2007/0240860 | A1* | 10/2007 | Meyer et al. | 165/104.26 |
| 2007/0295486 | A1* | 12/2007 | Su et al. | 165/104.26 |
| 2007/0295494 | A1* | 12/2007 | Mayer et al. | 165/170 |
| 2009/0025910 | A1* | 1/2009 | Hoffman et al. | 165/104.26 |
| 2009/0194259 | A1* | 8/2009 | Meyer et al. | 165/104.26 |
| 2009/0205812 | A1* | 8/2009 | Meyer et al. | 165/104.26 |
| 2010/0006268 | A1* | 1/2010 | Meyer et al. | 165/104.26 |

* cited by examiner

*Primary Examiner* — Mohammad M Ali
*Assistant Examiner* — Raheena Rehman
(74) *Attorney, Agent, or Firm* — C. G. Mersereau; Nikolai & Mersereau, P.A.

(57) ABSTRACT

A thin heat pipe structure includes a pipe body, a thin-sheet member, and a plurality of bosses. The pipe body internally defines a receiving space, in which a working fluid is provided. The thin-sheet member includes a plurality of open spaces, and the bosses are provided in the open spaces, so that the bosses and the thin-sheet member are disposed in the receiving space of the pipe body at the same time. A method of manufacturing thin pipe structure is also disclosed for manufacturing thin heat pipe structure with reduced time and labor, and protecting a wick structure formed in the thin heat pipe structure against damage. Therefore the thin heat pipe structure can be manufactured with increased good yield and at reduced manufacturing cost.

7 Claims, 10 Drawing Sheets

THIN HEAT PIPE STRUCTURE AND METHOD OF MANUFACTURING SAME

This application claims the priority benefit of Taiwan patent application number 100101753 filed on Jan. 18, 2011.

FIELD OF THE INVENTION

The present invention relates to a thin heat pipe structure and method of manufacturing same, and more particularly to a thin heat pipe structure and method of manufacturing same that enables increased supporting strength and good yield of the thin heat pipe structure.

BACKGROUND OF THE INVENTION

In the constant technological progress nowadays, the removal of cold or heat is still a big hindrance to the development in the electronic industry. Following the demands for high performance, increased integration and multifunctional applications, the whole electronic industry has to challenge the requirement for good heat dissipation and takes it as a major task to work out a way for upgrading heat transfer efficiency.

A heat sink is usually employed to dissipate heat produced by electronic elements or electronic systems into air. It has been found a heat sink with lower thermal resistance would provide higher heat dissipation efficiency. Generally speaking, thermal resistance consists of spreading resistance existed in the heat sink and convection resistance existed between the surface of the heat sink and the ambient air. In actual application, materials with high thermal conductivity, such as copper and aluminum, are frequently used in the manufacturing of heat sinks with reduced spreading resistance. However, the convection resistance still exists to limit the performance of heat sinks and thereby prevents the new generation of electronic elements from achieving the required heat dissipation efficiency.

Thus, heat dissipation mechanisms capable of providing higher heat dissipation efficiency have drawn consumers' attention in the market. For example, thin heat pipes and vapor chambers with high thermal transfer performance have been used with heat sinks in an attempt to effectively solve the present heat dissipation problem.

The currently available thin heat pipe structure includes a thin pipe body having a hollow space therein. Metal powder is put in the hollow space of the thin pipe body and sintered to form a wick structure on an inner wall surface of the thin pipe body. Alternatively, a metal net structure is arranged in the hollow space of the thin pipe body to serve as a wick structure. Then, the thin pipe body is vacuumed and filled with a working fluid before being sealed to complete a thin heat pipe structure. The conventional thin heat pipe structure does not include any internal supporting structure and is therefore subject to collapse or thermal expansion. When the conventional thin heat pipe structure is subjected to pressure, the wick structure, i.e. the sintered metal powder in the thin pipe body is compressed and damaged to peel off from the inner wall surface of the thin pipe body, which results in largely reduced heat transfer performance of the thin heat pipe structure. Further, with the sintered wick structure formed on the inner wall surface of the thin pipe body or with the metal net structure arranged in the hollow space of the thin pipe body, the working fluid condensed from vapor into liquid flows from the cold end of the heat pipe structure back to the hot end only with the help of gravity or the wick structure on the inner wall surface of the thin pipe body. Thus, the conventional thin heat pipe structure has relatively low vapor-liquid circulation efficiency.

Taiwan New Utility Model Patent Number M336673 discloses a vapor chamber and supporting structure thereof. The vapor chamber includes an enclosure defining a hollow space therein, as well as a wick structure and a supporting structure provided in the enclosure. The supporting structure includes a plate, on which a plurality of symmetrically arranged and spaced channels is provided. In each of the channels, there is formed a corrugated sheet. The corrugated sheets respectively have an upper and a lower end separately pressed against the wick structure, so that the wick structure is brought to bear on inner wall surfaces of the enclosure. With the corrugated sheets provided in the hollow space of the vapor chamber, the sintered wick structure is prevented from peeling off or collapsing in the vapor chamber and both of the vapor-phase change and the heat transfer speed are increased. However, the corrugated sheets do not provide any significant help in the back flowing of the liquidized working fluid to the hot end or enabling increased capillary limit.

Therefore, the supporting structure in the prior art vapor chamber or thin heat pipe structure still requires improvement. In brief, the prior art chamber and thin heat pipe structure have the following disadvantages: (1) low good yield in production; (2) low vapor-liquid circulation efficiency; and (3) poor internal supporting strength.

SUMMARY OF THE INVENTION

It is therefore a primary object of the present invention to provide a thin heat pipe structure for overcoming the technical drawbacks in the conventional heat pipe structures.

Another object of the present invention to provide a method of manufacturing thin heat pipe structure, so that the thin heat pipe can be manufactured with increased good yield and at reduced manufacturing cost.

To achieve the above and other objects, the thin heat pipe structure according to the present invention includes a flat pipe body, a thin-sheet member, and a plurality of bosses. The pipe body includes a first side and a second side as well as a first closed and a second closed end to define a receiving space therein, and a working fluid is provided in the receiving space. The thin-sheet member is arranged in the receiving space of the pipe body, and includes a plurality of open spaces. The bosses are fixedly located in at least some of the open spaces on the thin-sheet member, and respectively have two opposite ends connected to the first and the second side of the pipe body.

To achieve the above and other objects, the method of manufacturing thin heat pipe structure according to the present invention includes the following steps:

preparing a flat pipe and a thin-sheet member having a plurality of open spaces and a plurality of bosses;

disposing the thin-sheet member in the flat pipe; and sealing the flat pipe.

The plurality of open spaces formed on the thin-sheet member functions to increase the liquid-vapor phase change in the thin heat pipe structure and accordingly increases the heat transfer rate of the thin heat pipe structure. The bosses formed on the thin-sheet member provide the pipe body with increased supporting strength. In the case of sintered powder bosses, their wick structure not only helps the liquidized working fluid to flow back at an increased speed, but also enables an increased capillary limit.

In brief, with the above arrangements, the thin heat pipe structure of the present invention can have largely increased supporting strength and provide largely upgraded heat transfer efficiency; and the method of manufacturing thin heat pipe structure according to the present invention is able to increase the good yield while reducing the manufacturing cost of the thin heat pipe structure.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof and with reference to the accompanying drawings. For the purpose of easy to understand, elements that are the same in the preferred embodiments are denoted by the same reference numerals.

Figure 1A:
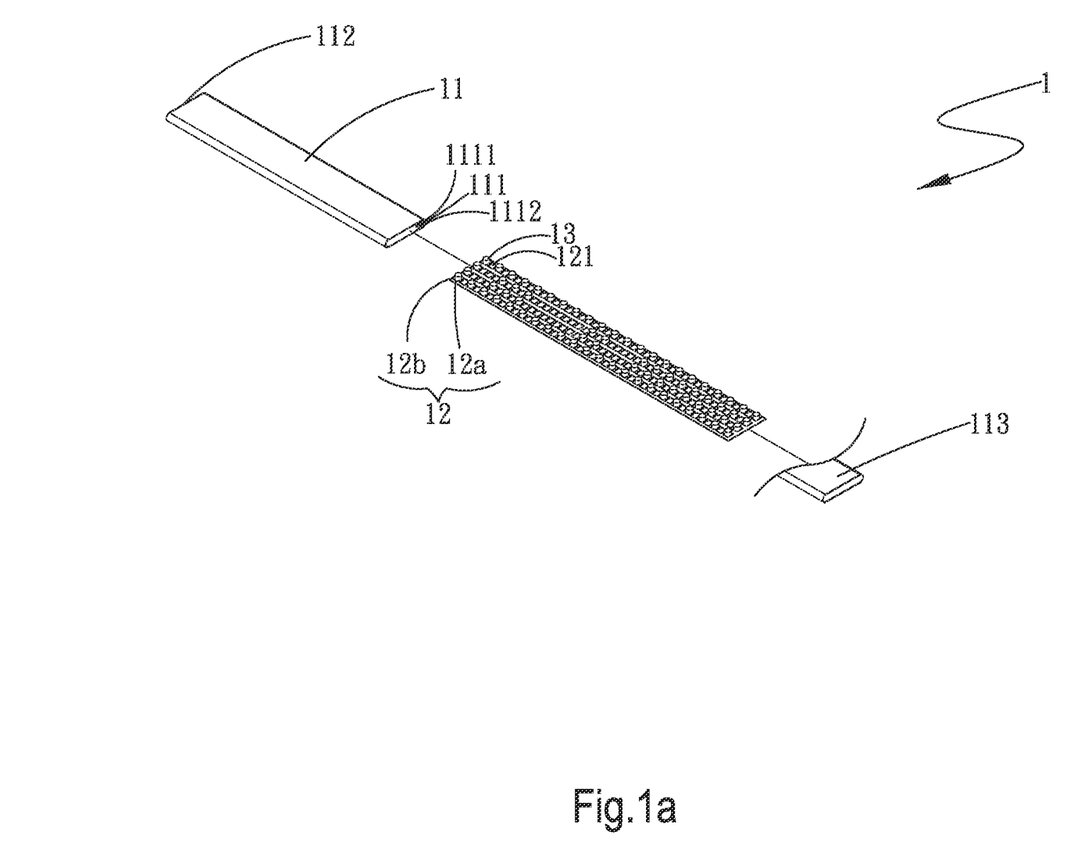
FIG. 1a is an exploded perspective view of the thin heat pipe structure of the present invention according to a first embodiment thereof.
Figure 2:
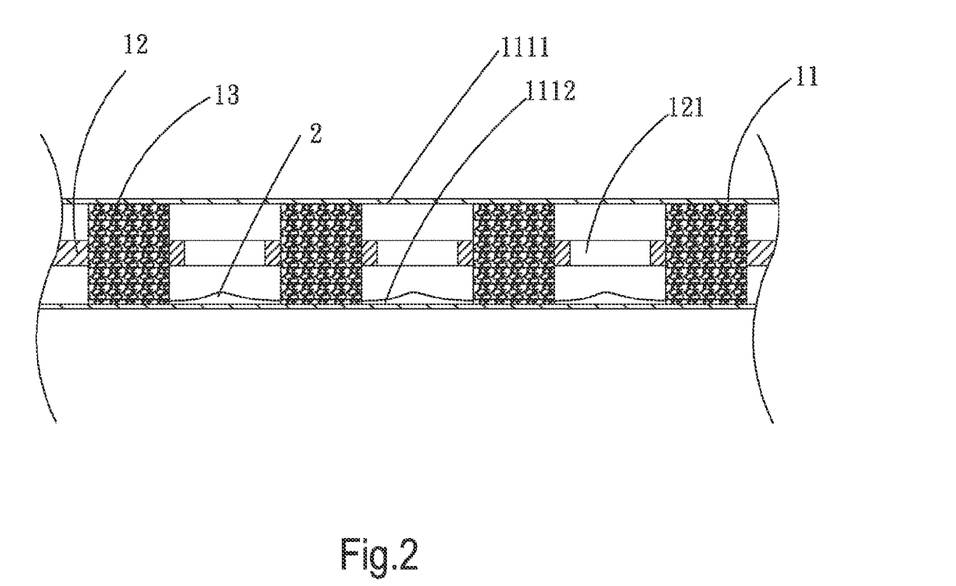
FIG. 2 is a fragmentary longitudinal sectional view of the thin heat pipe structure of the present invention according to the first embodiment thereof in an assembled state.

Please refer to FIGS. 1 and 2 that are exploded perspective view and assembled longitudinal sectional view, respectively, of a thin heat pipe structure 1 of the present invention according to a first embodiment thereof. As shown, the thin heat pipe structure 1 in the first embodiment includes a pipe body 11, a thin-sheet member 12, and a plurality of bosses 13.

The pipe body 11 is a flat pipe body having a first side 1111 and an opposite second side 1112 as well as a first closed end 112 and an opposite second closed end 113, which together define a receiving space 111 in the pipe body 11. A working fluid 2 is provided in the receiving space 111.

The thin-sheet member 12 is arranged in the receiving space 111 of the pipe body 11, and includes a plurality of first extended sections 12a and a plurality of second extended sections 12b. The first and the second extended sections 12a, 12b are connected to and intersected with one another to together define a plurality of open spaces 121 on the thin-sheet member 12.

The bosses 13 are sintered powder bodies and are fixedly located in some of the open spaces 121. Alternatively, as in a variant of the first embodiment shown in FIG. 1b, the bosses 13 are fixedly located in all of the open spaces 121. Two ends of the bosses 13 are respectively connected to the first side 1111 and the second side 1112 of the pipe body 11.

Figure 1B:
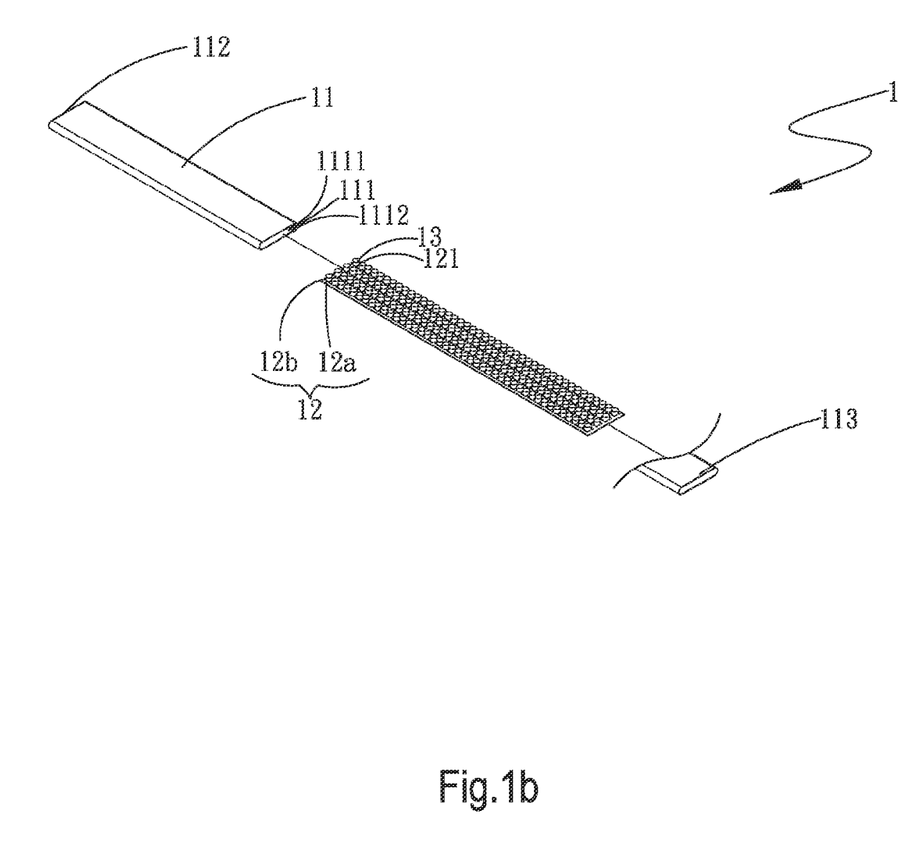
FIG. 1b is an exploded perspective view of the thin heat pipe structure of the present invention according to a variant of the first embodiment thereof.

The number of the bosses 13 can be increased or decreased according to actual need in different customized designs. Alternatively, the bosses 13 can be more densely provided on one or more selected areas of the thin-sheet member 12.

Figure 3:
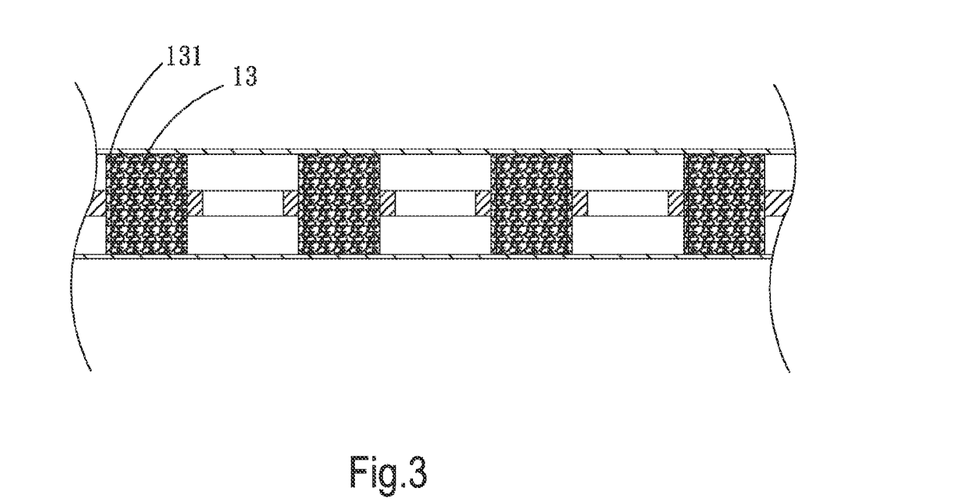
FIG. 3 is a fragmentary longitudinal sectional view of the thin heat pipe structure of the present invention according to a second embodiment thereof in an assembled state.

Please refer to FIG. 3 that is a fragmentary longitudinal sectional view of the thin heat pipe structure of the present invention according to a second embodiment thereof in an assembled state. As shown, the thin heat pipe structure in the second embodiment is generally structurally similar to that in the first embodiment, except that the bosses 13 in the second embodiment are provided on respective outer surface with at least one groove 131.

Figure 4:
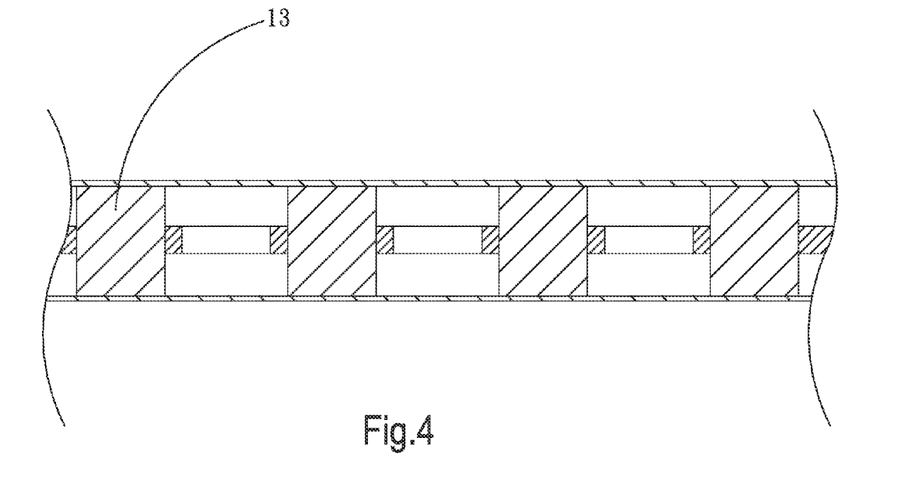
FIG. 4 is a fragmentary longitudinal sectional view of the thin heat pipe structure of the present invention according to a third embodiment thereof in an assembled state.

FIG. 4 is a fragmentary longitudinal sectional view of the thin heat pipe structure of the present invention according to a third embodiment thereof in an assembled state. As shown, the thin heat pipe structure in the third embodiment is generally structurally similar to that in the first embodiment, except that the bosses 13 in the third embodiment are copper bosses 13.

Figure 5:
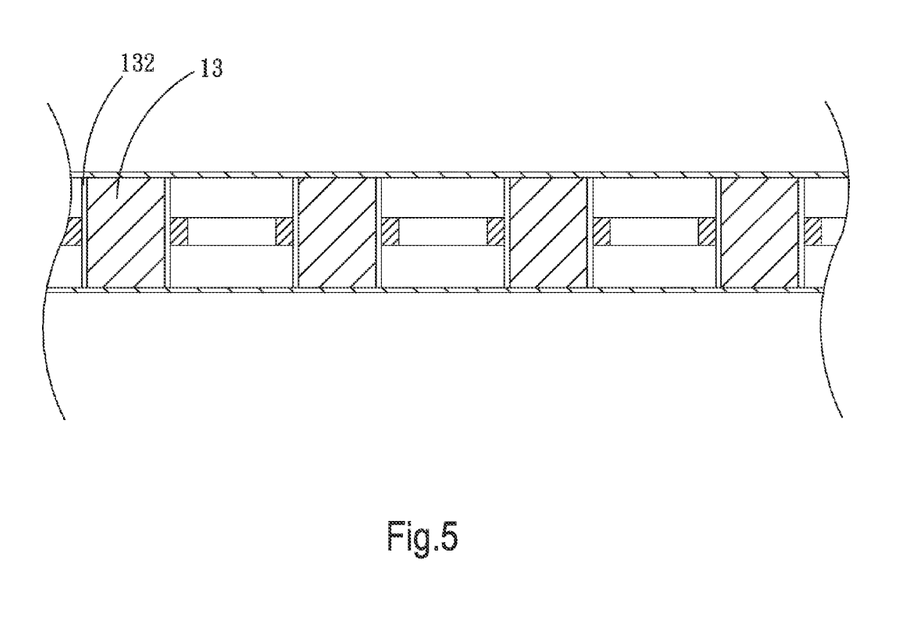
FIG. 5 is a fragmentary longitudinal sectional view of the thin heat pipe structure of the present invention according to a fourth embodiment thereof in an assembled state.

FIG. 5 is a fragmentary longitudinal sectional view of the thin heat pipe structure of the present invention according to a fourth embodiment thereof in an assembled state. As shown, the thin heat pipe structure in the fourth embodiment is generally structurally similar to that in the third embodiment, except that the bosses 13 in the fourth embodiment are provided on respective outer surface with at least one groove 132.

Figure 6:
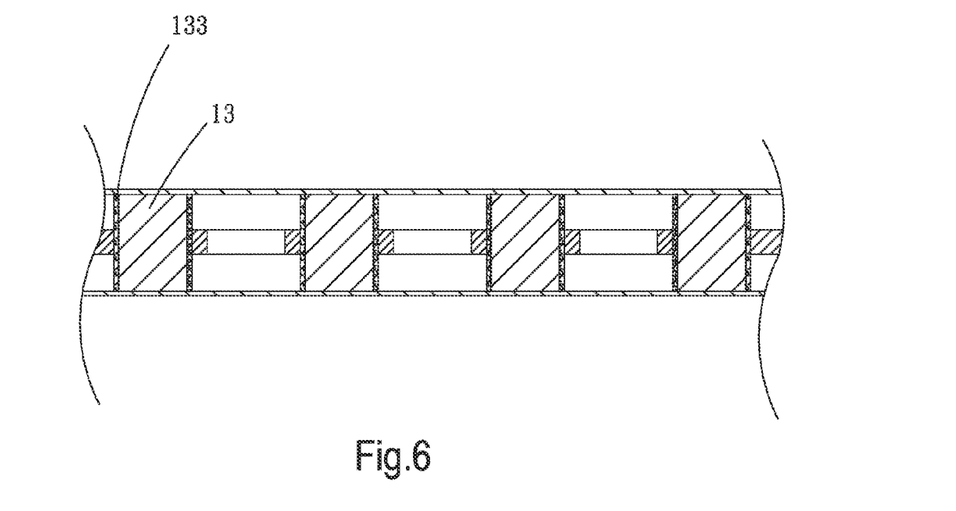
FIG. 6 is a fragmentary longitudinal sectional view of the thin heat pipe structure of the present invention according to a fifth embodiment thereof in an assembled state.

FIG. 6 is a fragmentary longitudinal sectional view of the thin heat pipe structure of the present invention according to a fifth embodiment thereof in an assembled state. As shown, the thin heat pipe structure in the fifth embodiment is generally structurally similar to that in the third embodiment, except that the bosses 13 in the fifth embodiment are provided on respective outer surface with a ring-shaped sintered powder body 133.

Figure 7:
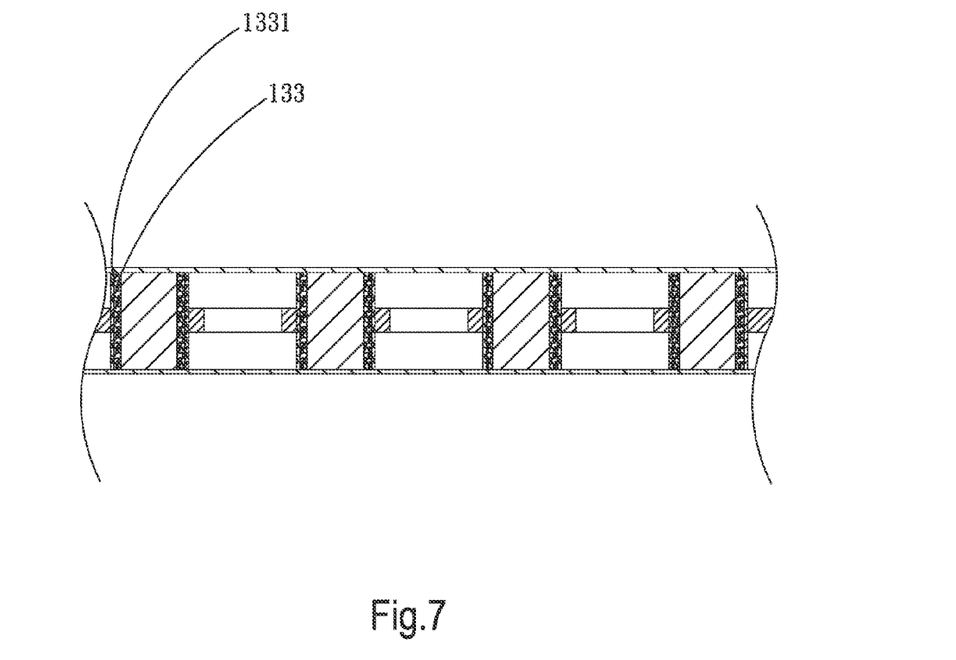
FIG. 7 is a fragmentary longitudinal sectional view of the thin heat pipe structure of the present invention according to a sixth embodiment thereof in an assembled state.

FIG. 7 is a fragmentary longitudinal sectional view of the thin heat pipe structure of the present invention according to a sixth embodiment thereof in an assembled state. As shown, the thin heat pipe structure in the sixth embodiment is generally structurally similar to that in the fifth embodiment, except that the bosses 13 in the sixth embodiment are provided on respective ring-shaped sintered powder body 133 with at least one groove 1331.

Figure 8:
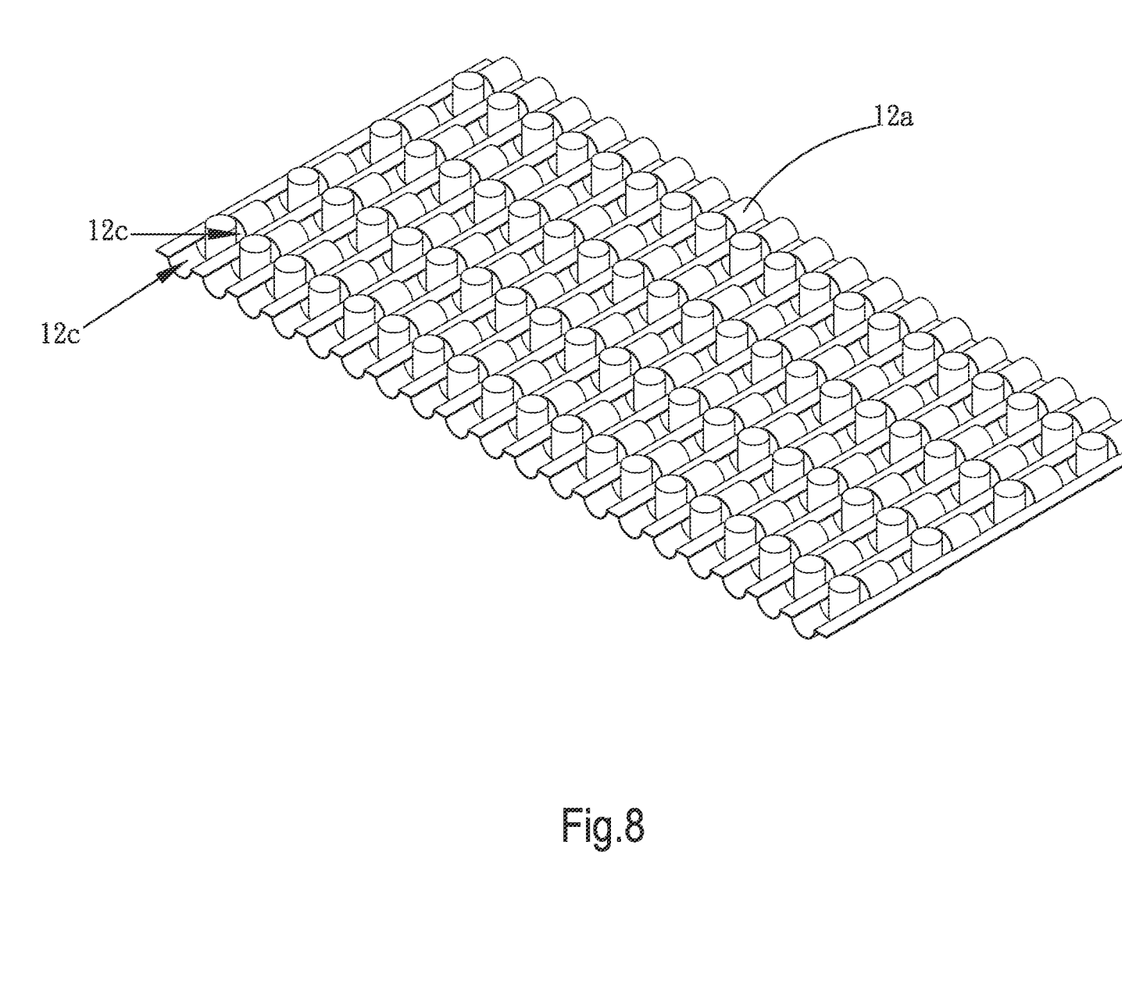
FIG. 8 is a perspective view of a thin-sheet member used in the thin heat pipe structure of the present invention according to a seventh embodiment thereof.

Please refer to FIG. 8 that is a perspective view of the thin-sheet member used in the thin heat pipe structure of the present invention according to a seventh embodiment thereof. As shown, the thin-sheet member in the seventh embodiment is generally structurally similar to that in the first embodiment, except that the thin-sheet member in the seventh embodiment has a plurality of first extended sections 12a in a curved shape, and each of the curved first extended sections 12a defines a passage 12c at a concaved side thereof.

In the previously described embodiments of the present invention, the provision of the bosses 13 on the thin-sheet member 12 not only gives the thin heat pipe structure 1a largely increased supporting strength, but also increases the vapor-liquid circulation efficiency inside the thin heat pipe structure 1, allowing the liquidized working fluid 2 to flow back from the bosses 13 and accordingly, enabling the thin heat pipe structure 1 to have increased heat transfer efficiency.

Figure 9:
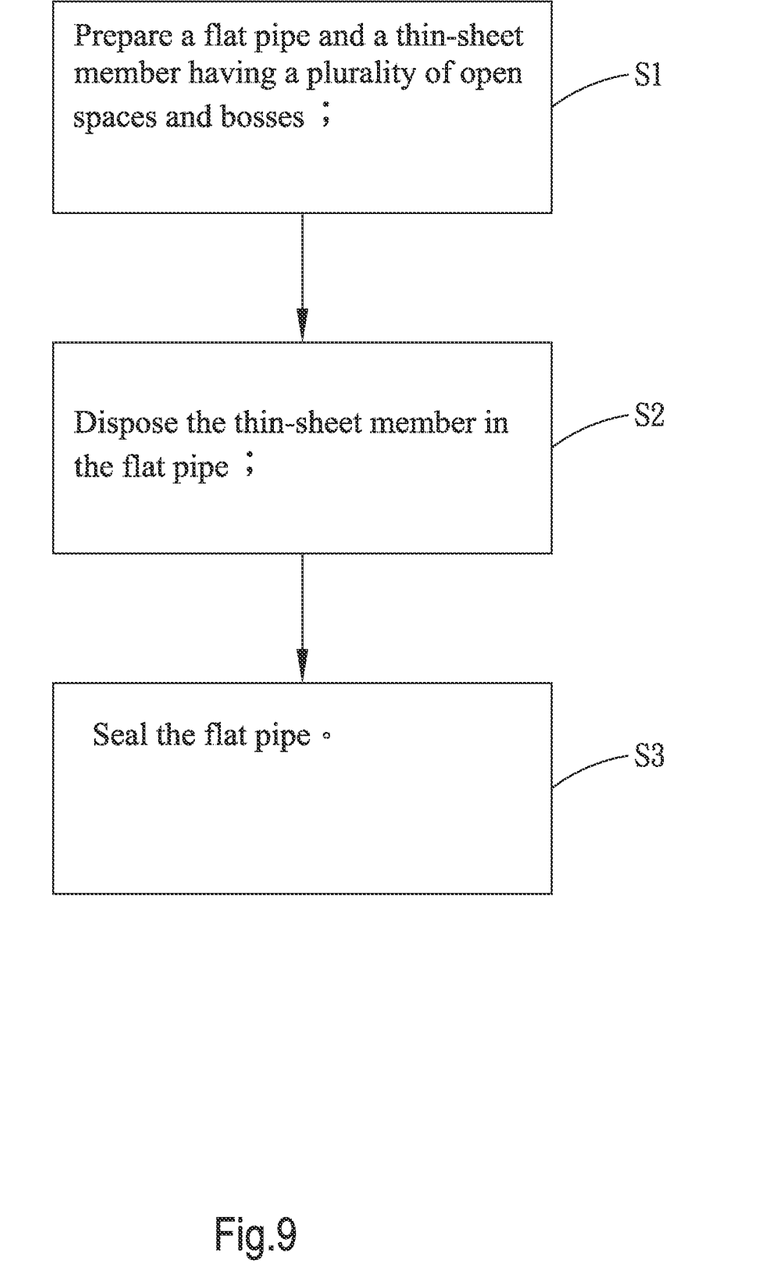
FIG. 9 is a flowchart showing the steps included in a first embodiment of the method of manufacturing thin heat pipe according to the present invention.

Please refer to FIG. 9 along with FIGS. 1, 2, 11 and 12. FIG. 9 is a flowchart showing the steps included in the thin heat pipe structure manufacturing method of the present invention according to a first embodiment thereof.

As shown, in a step S1, a flat pipe and a thin-sheet member having a plurality of open spaces and bosses are prepared.

Figure 11:
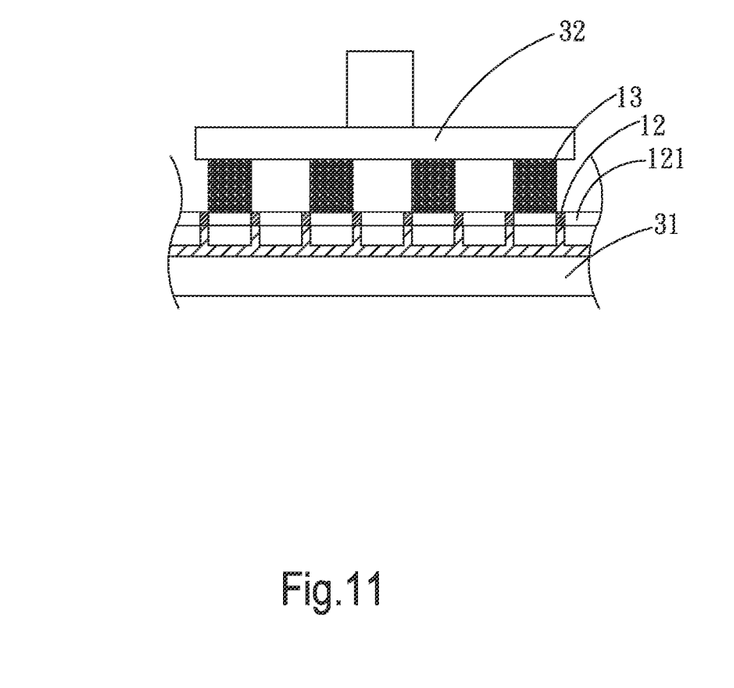
FIGS. 11 and 12 schematically illustrate the first embodiment of the method of manufacturing thin heat pipe according to the present invention.
Figure 12:
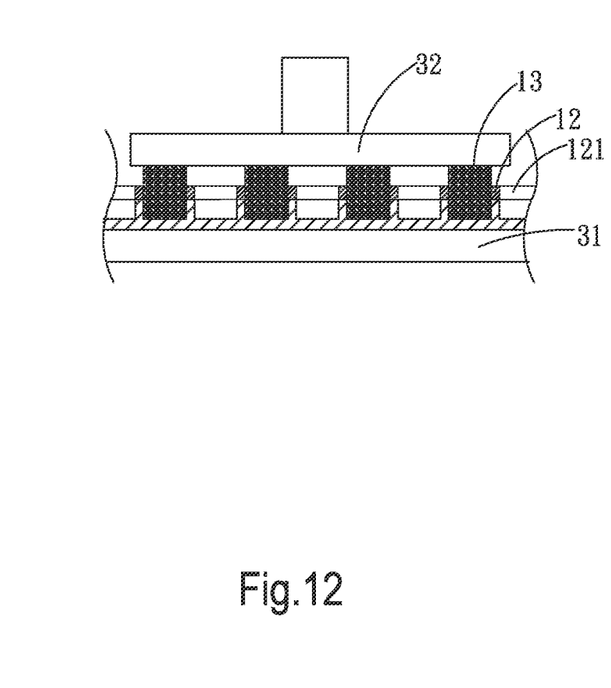

The flat pipe (i.e. the pipe body 11) can be made of a copper material, an aluminum material, or any material having good thermal conductivity. While the illustrated first embodiment of the method for manufacturing the thin heat pipe structure is described based on a copper flat pipe, it is understood the flat pipe can also be made of other materials without being limited to the copper material. The prepared thin-sheet member (i.e. the thin-sheet member 12) has a plurality of open spaces (i.e. the open spaces 121) and a plurality of bosses (i.e. the bosses 13). The bosses 13 are sintered powder bodies and are associated with the thin-sheet member 12 by means of mechanical punching. That is, by using a punch swage 31 and a punch 32 as shown in FIGS. 11 and 12, the bosses 13 are pressed into the open spaces 121 of the thin-sheet member 12.

Then, in a step S2, the thin-sheet member is disposed in the flat pipe.

In this step, the thin-sheet member (i.e. the thin-sheet member 12) along with the bosses (i.e. the bosses 13) located in the open spaces 121 is disposed in the flat pipe (i.e. the receiving space 111).

Finally, in a step S3, the flat pipe is sealed.

In the final step, the flat pipe (i.e. the pipe body 11) is sealed.

The thin heat pipe structure manufacturing method of the present invention according to a second embodiment thereof is now described with reference to FIG. 9 along with FIGS. 1, 2, 13 and 14.

In a step S1 according to the second embodiment of the thin heat pipe structure manufacturing method, a flat pipe and a thin-sheet member having a plurality of open spaces and bosses are prepared.

Figure 13:
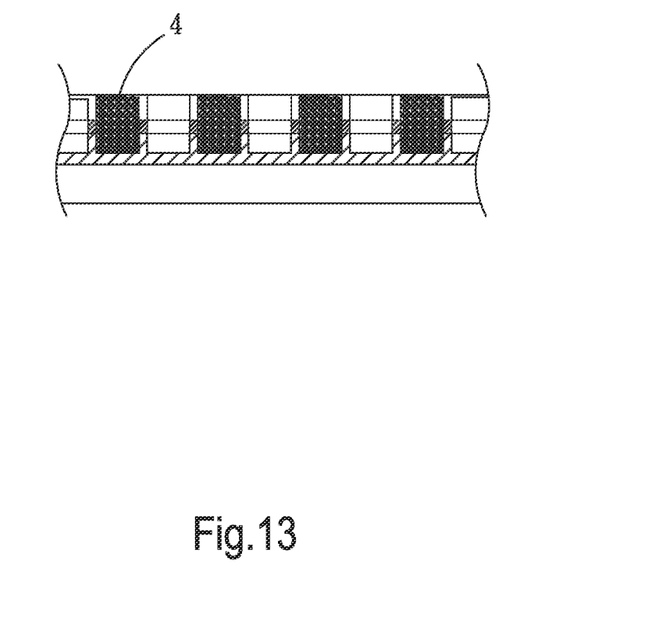
FIGS. 13 and 14 schematically illustrate the second embodiment of the method of manufacturing thin heat pipe according to the present invention.
Figure 14:
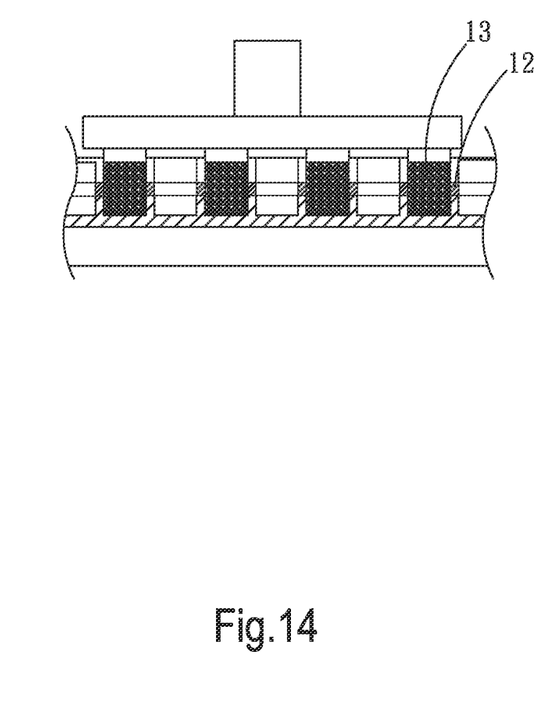

The flat pipe (i.e. the pipe body 11) can be made of a copper material, an aluminum material, or any material having good thermal conductivity. While the illustrated second embodiment of the method for manufacturing the thin heat pipe structure is described based on a copper flat pipe, it is understood the flat pipe can also be made of other materials without being limited to the copper material. The prepared thin-sheet member (i.e. the thin-sheet member 12) has a plurality of open spaces (i.e. the open spaces 121) and a plurality of bosses (i.e. the bosses 13). The bosses 13 are sintered powder bodies and are associated with the thin-sheet member 12 by means of sintering metal powder 4. That is, a type of metal powder 4 is filled in the open spaces 121 at where the bosses 13 are to be formed, as shown in FIG. 13; and then, the metal powder 4 filled in the open spaces is rammed and sintered, so that the bosses 13 are formed in the open spaces 121 to thereby associate with the thin-sheet member 12, as shown in FIG. 14.

The second embodiment of the thin heat pipe structure manufacturing method also includes a step S2 and a step S3, which are identical to the steps S2 and S3 in the first embodiment and are therefore not repeatedly described herein.

Figure 10:
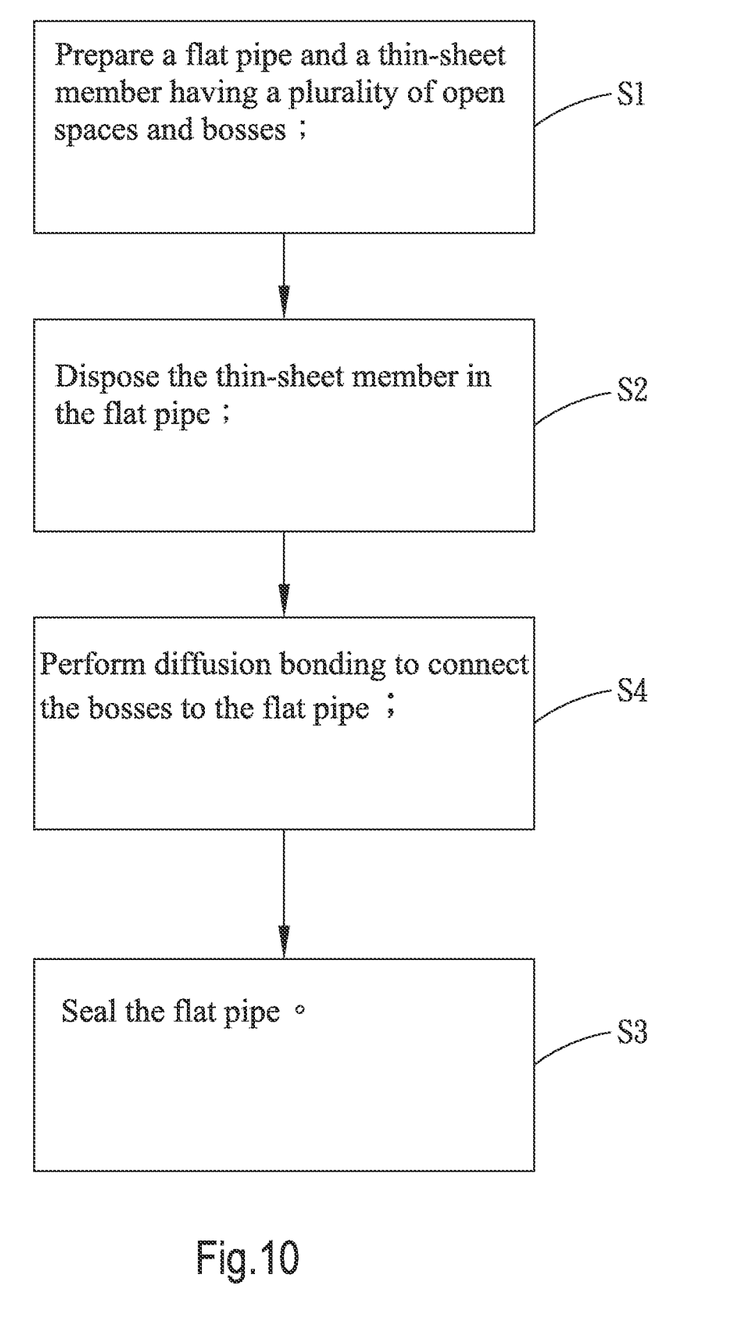
FIG. 10 is a flowchart showing the steps included in a third embodiment of the method of manufacturing thin heat pipe according to the present invention.

Please refer to FIG. 10 along with FIGS. 1 and 2 at the same time. FIG. 10 is a flowchart showing the steps included in a third embodiment of the thin heat pipe structure manufacturing method of the present invention. As shown, the third embodiment of the thin heat pipe structure manufacturing method includes four steps S1, S2, S3 and S4. Since the steps S1, S2 and S3 in the third embodiment are identical to the steps S1, S2 and S3 in the first embodiment, they are not repeatedly described herein. The step S4 is performed after the step S2 (disposing the thin-sheet member in the flat pipe) and before the step S3 (sealing the flat pipe) for connecting the bosses to the flat pipe through diffusion bonding.

The diffusion bonding step allows the bosses 13 to associate with the pipe body 11 with increased bonding strength between them and thereby eliminates the thermal resistance in the thin heat pipe structure.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A heat pipe structure, comprising:
a pipe body having a flat shape, and including a first side and an opposite second side as well as a first closed end and an opposite second closed end to define a receiving space in the pipe body; and a working fluid being provided in the receiving space;
a sheet member being arranged in the receiving space of the pipe body, and including a plurality of first extended sections and a plurality of second extended sections, the first and the second extended sections being connected to and intersected with one another to thereby define a plurality of open spaces on the sheet member;
a plurality of bosses being fixedly located in at least some of the open spaces on the sheet member, and respectively having two opposite ends connected to the first and the second side of the pipe body; and
wherein the first extended sections respectively have a curved shape, and each of the curved first extended sections defines a hollow passage within a curved structure;
wherein the curved structures of the first extended sections are arranged in a plurality of alternate rows which include only concave structures in a row and only convex structures in an adjacent row.

2. The heat pipe structure as claimed in claim 1, wherein the bosses are copper bosses.

3. The heat pipe structure as claimed in claim 1, wherein the bosses are copper bosses and are provided on their respective outer surfaces with at least one groove.

4. The heat pipe structure as claimed in claim 1, wherein the bosses are sintered powder bodies.

5. The heat pipe structure as claimed in claim 1, wherein the bosses are copper bosses and are provided on their respective outer surfaces with a ring-shaped sintered powder body.

6. The heat pipe structure as claimed in claim 1, wherein the bosses are sintered powder bodies and are provided on their respective outer surfaces with at least one groove.

7. The heat pipe structure as claimed in claim 1, wherein the bosses are located in all the open spaces on the sheet member.

* * * * *